United States Patent

Kudoh

[11] Patent Number: 6,097,275
[45] Date of Patent: Aug. 1, 2000

[54] MOTOR STARTING AND PROTECTING APPARATUS

[75] Inventor: Kanezo Kudoh, Kawasaki, Japan

[73] Assignee: Texas Instruments Incorporated, Dallas, Tex.

[21] Appl. No.: 09/094,353

[22] Filed: Jun. 9, 1998

[30] Foreign Application Priority Data

Jul. 10, 1997 [JP] Japan .................................. 9-200752

[51] Int. Cl.[7] .......................... H01H 37/54; H01H 37/32; H02P 1/42; H02P 1/26

[52] U.S. Cl. .......................... 337/377; 337/365; 337/362; 337/380; 337/398; 337/336; 337/338; 337/343; 318/783; 318/778; 318/785; 318/791

[58] Field of Search .................................. 337/377, 85, 89, 337/97, 100–102, 112, 333, 342, 343, 379, 380, 349, 56; 361/103, 105, 31, 32; 200/168 A, 168 B; 318/783, 778, 767, 785, 791

[56] References Cited

U.S. PATENT DOCUMENTS

| | | | |
|---|---|---|---|
| 2,117,123 | 5/1938 | Werner | 318/783 |
| 2,451,535 | 10/1948 | Clark | 337/86 |
| 3,521,138 | 7/1970 | Enemark et al. | |

FOREIGN PATENT DOCUMENTS

| | | | |
|---|---|---|---|
| 0430662 | 6/1991 | European Pat. Off. | |
| 55065659 | 12/1981 | Japan | H02P 1/42 |
| 4289786 | 3/1991 | Japan. | |

*Primary Examiner*—Leo P. Picard
*Assistant Examiner*—Anatoly Vortman
*Attorney, Agent, or Firm*—Russell E. Baumann; Richard L. Donaldson; Rene' E. Grossman

[57] ABSTRACT

A motor starting device (1) has a thermostatic element (14) of a first switch circuit (11), a first resistive heater (13) serially connected to the first switch circuit, a thermostatic element (22) of a second switch circuit (21) and a second resistive heater (23) serially connected to the second switch circuit. The thermostatic element (22) of the second switch circuit is heated by both the first and second resistive heaters and, after actuation, is closer to the first resistive heater (13), thereby bringing the second switch circuit (23) into a de-energized state. When the second switch circuit (21) and the second resistive heater (23) are employed in the motor starting device, it becomes possible to provide a large electric current to the start winding during the start-up phase and to make the electric current that flows to the start winding zero after the start-up phase.

4 Claims, 4 Drawing Sheets

MOTOR STARTING AND PROTECTING APPARATUS

FIELD OF THE INVENTION

This invention relates generally to a switch device which is used for starting a motor and more particularly to a motor starting relay and protector employing thermostatic elements.

BACKGROUND OF THE INVENTION

A switch device as identified by numeral 101 in FIGS. 6(a) and 6(b) has been employed in the past for starting a motor and for protecting the motor against over-current conditions. Switch device 101 comprises a protection device 108 and a resistance element 109 for starting, with one end of the protection device 108 being connected to the power line L1 and the other end connected to a common terminal C of a motor 110. One end of resistance element 109 is connected to a start winding terminal S of motor 110 and the other end is connected to ground line L2. A main winding and a start winding (not shown in the drawings) are provided inside motor 110, the ends of the main winding being connected to common terminal C and the main winding terminal M respectively and the ends of the start winding being connected to common terminal C and the start winding terminal S, respectively.

A switch circuit 111 and a resistive heater 113 are provided inside the protection device 108 and, prior to starting motor 110, the switch circuit 111 is in an electrically conductive state. Accordingly, the common terminal C is connected, in that state, to power line L1 through switch circuit 111. The main winding terminal M is directly connected to ground line L2 and, at the time when motor 110 is to be started, voltage is impressed between power line L1 and ground line L2 with the result that voltage is impressed between the common terminal C and the main winding terminal M and the start winding terminal S. Resistance element 109 is a PTC (positive temperature coefficient of resistivity) element having a low resistance at normal or room temperature and which, above an anomaly temperature, increases in resistance as temperature increases. Since it has low resistance at start-up, when voltage is impressed between the common terminal C and main winding terminal M and the start winding terminal S, a large electric current flows to the start winding, thereby assisting the starting phase. When a large electric current flows to the start winding, motor 110 starts rotating and, as its rate of rotation increases, the electric current that flows to the start winding becomes unnecessary. During the starting phase, resistance element 109 is heated by the electric current that flows to the start winding and the resistance value increases. As a result of this, the electric current that flows to the start winding is gradually reduced to a low level but it does not become zero. Switch 101 has a switch arm 112, a contact 115 and a resistive heater 113 provided in the first switch circuit 111 for the electric current that flows through the main winding and the start winding. A bimetal element 114 is provided in close proximity to resistive heater 113 inside protection device 108 so that the electric current which flows through resistive heater 113 generate heat which will heat bimetal element 114 raising the temperature of the bimetal. In as much as the resistive heater 113 has a low resistance value however, the amount of heat generated by the electric current that flows when motor 110 is started or driven is small and the increase in temperature of bimetal element 114 is small as well.

In the event that an excessive electric current flows to motor 110 due to some fault condition, a large amount of heat is generated by resistive heater 113, with a result that bimetal element 114 is heated to a high temperature. Regarding the shape of bimetal element 114, the side which faces arm 112 is concave facing arm 112 at normal temperatures but, if it is heated to an actuation temperature, e.g., 145° C., by the heat that is supplied from resistance heater 113, it snaps to the opposite, convex configuration facing arm 112 as is shown in FIG. 6(b), thereby raising arm 112 and bringing contact 115 into an open state. When the contact 115 assumes an open state, current flow to the motor 110 is terminated.

According to the switch device of the prior art, starting of motor 110 is carried out by PTC element 109 and protection against over-current is carried out by protection device 108 as described above. Motor 110 is protected relative to an electric current of a selected quantity which can be varied by changing the base resistance value of the PTC element, changing the start-up characteristics, changing the resistance value of resistive heater 113, or changing the shape or the actuation temperature of bimetal element 114. Since the electric current that flows to the start winding is controlled by the resistance change of resistance element 109 in the above switch 101, however, it becomes necessary to increase the volume of the element in order to make the resistance value of resistance element 109 sufficiently small at the time of the start-up, with a result that there are cases where the starting characteristics of motor 110 deteriorate as the starting electric current is restricted by resistance element 109. During operation of motor 110, moreover, resistance element 109 becomes highly resistant. As some electric current continues flowing to the start winding through resistance element 109 even during operation of motor 110, however, there arises a problem in that the operating efficiency of motor 110 is decreased.

SUMMARY OF THE INVENTION

An object of the present invention is the provision of a device which eliminates the prior art limitations described above. Another object of the invention is the provision of a switch device having a small number of parts and a lower cost of installation. Yet another object is the provision of a switch device whose operating efficiency is high and, at the same time is capable of supplying a large electric current to the start winding.

Briefly, in accordance with the invention, a switch device comprises first and second switch circuits each having a contact and a thermostatic element, with the thermostatic element being deformed or actuated when it is heated to an actuation temperature, thereby switching the contact from the closed state to the open state and first and second resistive heaters which generate heat when electric current flows therethrough in which the thermostatic element of the first switch circuit, the first resistive heater, the thermostatic element of the second switch circuit and the second resistive heater are arranged in the following order: the thermostatic element of the first switch circuit is heated by the first resistive heater and the thermostatic element of the second switch is heated by both the first and second resistive heaters. According to a feature of the invention the first switch circuit is connected with the first resistive heater in series and the second switch circuit is connected with the second resistive heater in series to make it a four-terminal structure. According to another feature, when the thermostatic element of the second switch circuit is actuated, with the contact being changed from the closed state over to the open state, the thermostatic element moves closer to the first resistive heater. As described, the first and second switch circuits have a contact and a thermostatic element and the first and second resistive heaters are provided, with the thermostatic elements of the first and second switch circuits being actuated when heated to the actuation temperature and the contact of each switch circuit being switched from the closed state to the open state, the first and second resistive heaters being arranged to generate heat when the electric current flows therethrough. Accordingly, the thermostatic element of the first switch circuit is heated by the first resistive heater but the thermostatic element of the second switch circuit is heated by both the first and second resistive heaters, with a consequence that, even if the amount of heat generated by the first and second resistive heaters is reduced, it becomes possible to raise the temperature of the thermostatic element in the second switch circuit to the actuation temperature. If, in this case, the thermostatic element is arranged as to move into closer heat conductive relation with the first resistive heater when the thermostatic element in the second switch circuit is actuated and the contact is switched from the closed state to the open state, the amount of heat that is supplied from the first resistive heater increases after actuation. Even if the heat generation of the second resistance heater ceases, therefore, the thermostatic element in the second switch circuit can maintain its actuated state. Regarding the switch device that has been explained above, if it is arranged so that the thermostatic element of the first switch circuit is heated to the actuation temperature and is actuated, with its actuated state being maintained even when the heat generation of the first resistive heater ceases, it becomes possible for the first switch circuit to serve as a protection circuit against over-current conditions. If, on the other hand, it is arranged so that, in the case where the thermostatic element of the second switch circuit is heated to the actuation and is actuated, the original shape is reset upon the termination of heat generation of the first and second resistive heaters, the second switch circuit assumes an electrically conductive state prior to starting of the motor but assumes a shut-off state during operation of the motor. Accordingly, it becomes possible for the second switch circuit to serve as a start circuit of the motor.

BRIEF DESCRIPTION OF THE DRAWINGS

The present invention will be more fully understood and appreciated from the following detailed description taken in conjunction with the drawings in which.

DETAILED DESCRIPTION OF PREFERRED EMBODIMENT

Figure 1A:
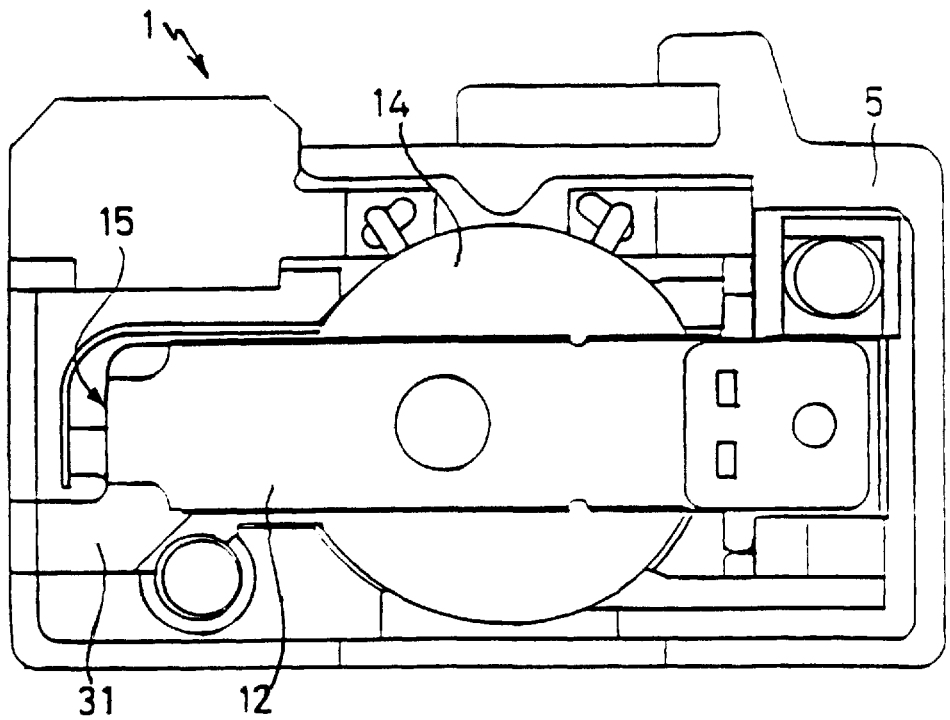
FIG. 1(a) is an inner top plan view of a switch device made according to the invention, with FIG. 1(b) being a rough elevational cross section of its interior.
Figure 1B:
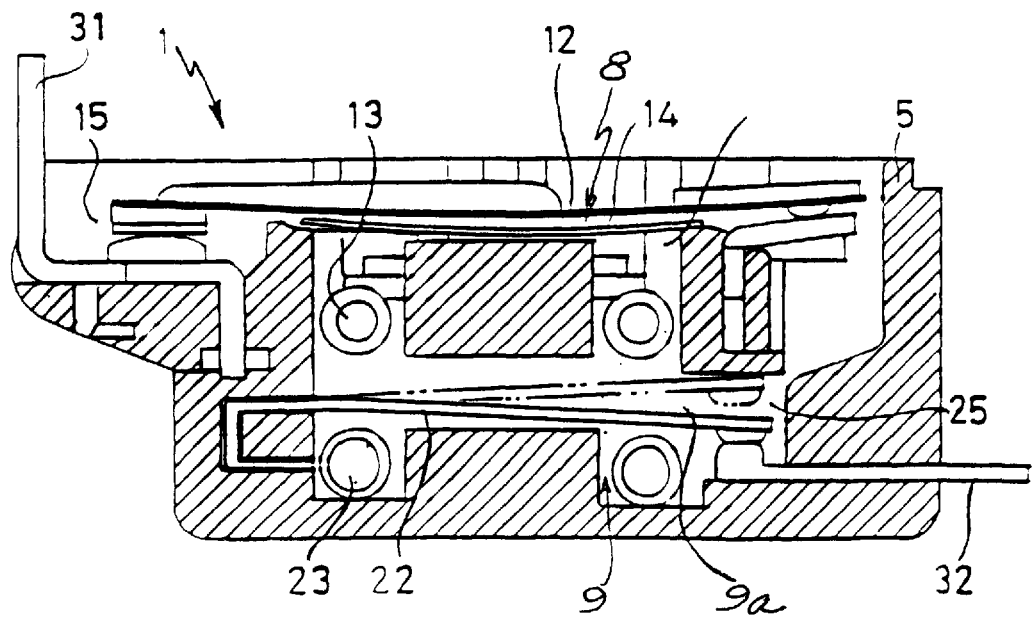
Figure 2:
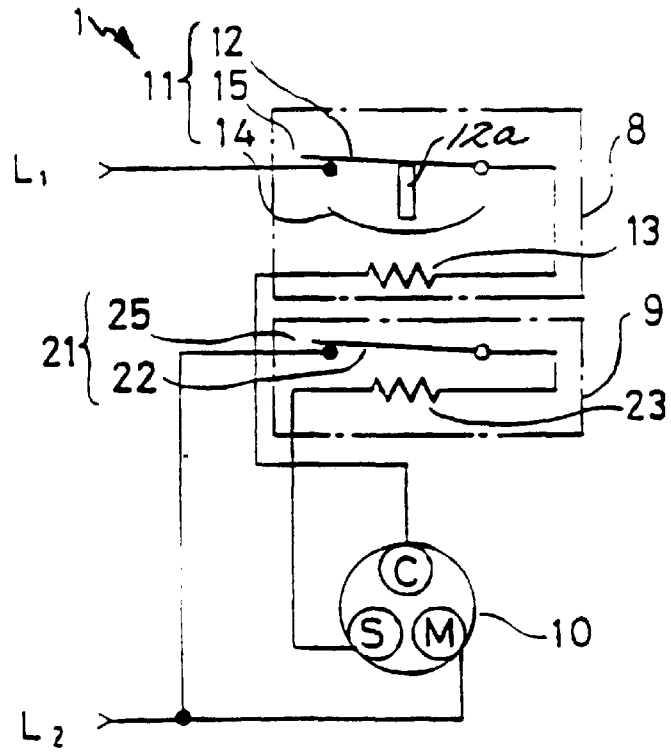
FIG. 2 is a circuit diagram of the switch device at the time of motor starting.
Figure 3:
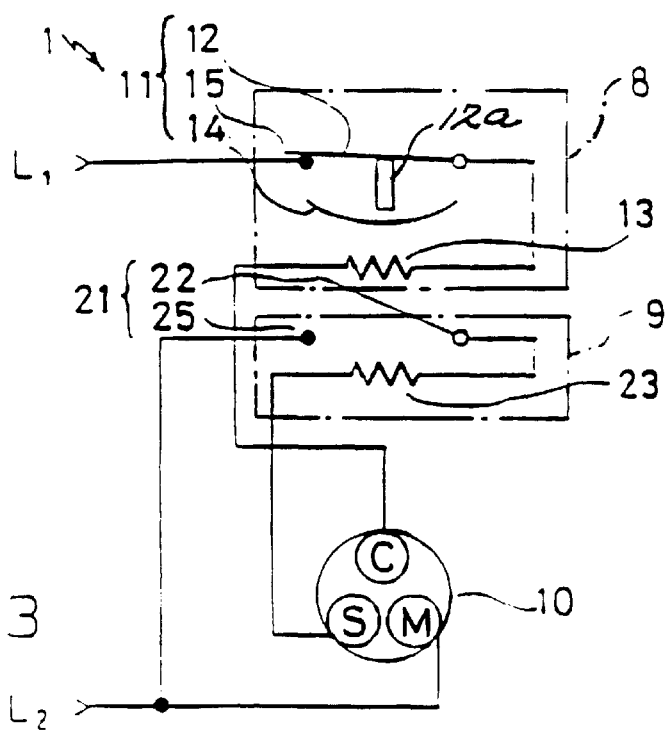
FIG. 3 is a circuit diagram of the switch device at the time of normal motor operation.
Figure 4:
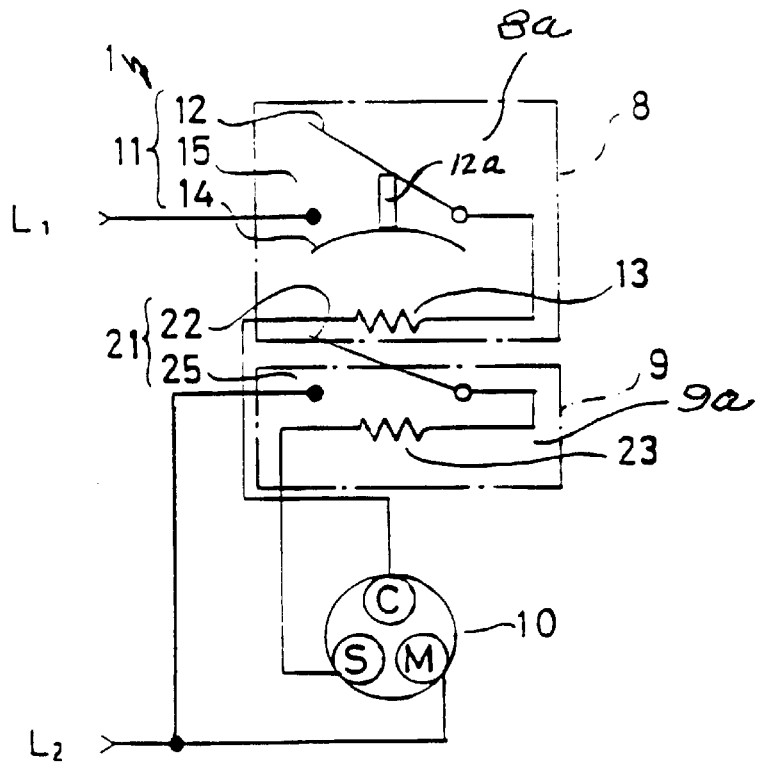
FIG. 4 is a circuit diagram of the switch device at the time when the motor is subjected to an excessive electric current.

The preferred embodiment will now be described with reference to FIGS. 1–5. Switch device 1 serves to start a motor and to provide protection against excess current conditions. Switch device 1 comprises a casing 5 made of electrically insulative material such as resin, with a protection device 8 in a switch chamber 8a and a start device 9 in a switch chamber 9a being accommodated therein. Motor 10 has a common terminal C, a start winding terminal S and a main winding terminal M, with the common terminal C being connected to the power line L1 through protection circuit 11. Start winding terminal S is connected to the ground line L2 through a start device 9 and the main winding terminal M is directly connected to ground line L2. Protection device 8 has a first switch circuit 11 and a first resistive heater 13 connected in a series circuit relation. The other end of first switch circuit 11 is connected to power line L1 through terminal 31 (FIG. 1(a), 1(b)) that has been fixedly mounted to casing 5 and the other end of first resistive heater 13 is connected to common terminal C through a terminal which is not shown in FIGS. 1(a) and 1(b). Start device 9 has a second switch circuit 21 and a second resistive heater 23 connected in a series circuit relation. The other end of the second switch circuit 21 is connected to ground line L2 through terminal 32 which has been mounted in casing 5 and the other end of second resistive heater 23 is connected to the start winding terminal S through a terminal, not shown in FIGS. 1(a) and 1(b). The first switch circuit 11 has an arm 12 and a thermostatic element, such as a snap acting bimetal 14, with arm 12 and bimetal element 14 being closely arranged approximately in parallel relationship with each other. One end of arm 12 is provided with an electrical contact 15 and the bimetal element 14 has a dish shape with a concave configuration facing arm 12 at normal or room temperature with contact 15 in a closed state in that shape. When bimetal element 14 is heated and its temperature reaches a selected actuation temperature, e.g., 145° C., it snaps to an opposite dished configuration with a convex configuration facing arm 12. In connection with this deformation or snapping, the convexly shaped bimetal element biases arm 12 upwardly through a motion transfer element 12a, as seen in FIG. 4, with a result that the contact 15 is switched over to the open state. The second switch circuit 21 has a cantilever arm 22 comprising a thermostatic element such as a snap acting bimetal element and a contact 25 that has been provided at a free end of the arm 22. The shape of the arm 22 is such that it brings the contact 25 to a closed state at normal temperature but is deformed when it is heated to a temperature higher than a selected actuation temperature, e.g., 90° C., at which point the contact 25 is made to assume an open state. For example, thermostatic arm element 22 can have a convex configuration (not shown) facing first heater 13 when contact 25 is in a closed state and a concave configuration facing first heater 13 when contact 15 is in the open state with the free end of element 22 moving into closer thermal coupling with heater 13.

Figure 5:
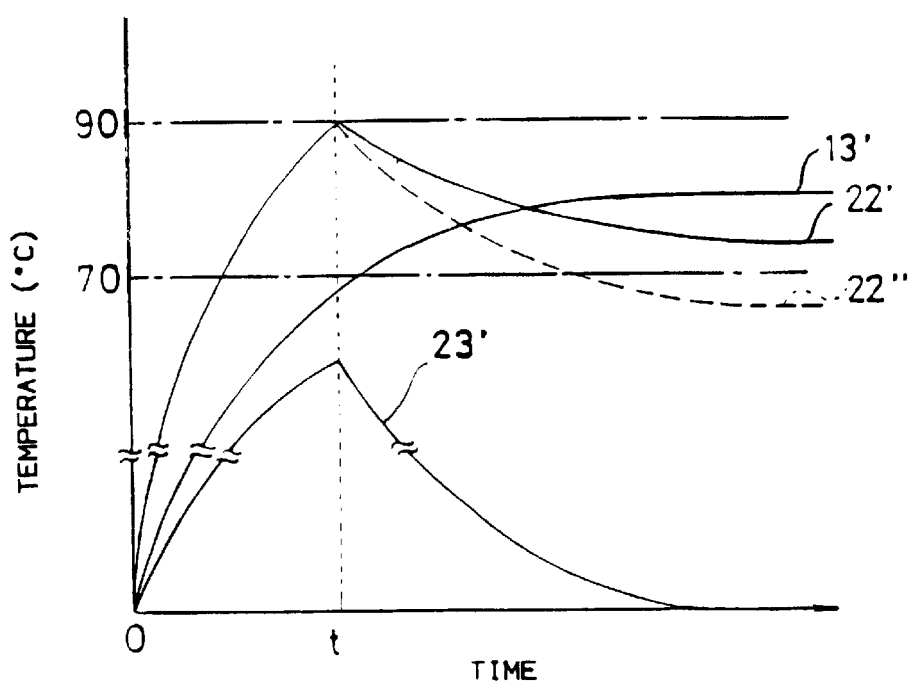
FIG. 5 is a graph provided as an aid in explaining the change in temperature of elements of the second switch circuit.

Motor 10 includes a start winding that starts a rotor and a main winding that generates power (the start winding and the main winding are not shown in the drawing). The ends of the start winding are connected to the common terminal C and the start winding terminal S, respectively and the ends of the main winding are connected to the common terminal C and the main winding terminal M, respectively. As bimetal element 14 and arm 22 are at normal temperature prior to the start of the operation of motor 10, the first and second switch circuits 11 and 21 are in an electrically conductive state as shown in FIG. 2. When voltage is impressed between power line L1 and ground line L2 for the purpose of starting the operation of motor 10, voltage is impressed across both start and main windings. In the stationary state, however, the resistance of the main winding and the start winding is small, with a result that an electric current of about five amps flows to the main winding and an electric current of about five amps also flows to the start winding. As the electric current flows through first and second resistive heaters 13 and 23 in protection device 8 and start device 9, both first and second resistive heaters 13 and 23 are heated at the time of motor starting. Arm 22 in second switch circuit 21 is positioned in close proximity to and between first and second resistive heaters 13 and 23 and, upon heating of first and second resistive heaters 13 and 23, arm 22 is heated by both resistive heaters 13 and 23. Curve 22' in the graph shown in FIG. 5 shows the change in temperature of arm 22. When arm 22 is not deformed and contact 25 is in the closed state, arm 22 is closer to second resistive heater 23 than to first resistive heater 13. Curve 13' in FIG. 5 shows the amount of heat that arm 22 receives from first resistive heater 13 and curve 23' shows the amount of heat that it receives from second resistive heater 23. As can be observed from curves 13' and 23', arm 22 has its temperature elevated when heated by both resistive heaters 13 and 23. Arm 22 is deformed at the point where the temperature has reached 90° C. at time t, with a result that contact 25 assumes an open state interrupting the electric current that flows to the start winding as well as second resistive heater 23. Therefore, the amount of heat that is supplied from second resistive heater 23 decreases as the heater cools. When contact 25 assumes an open state, the rotor of motor 10 is at the end of the start phase with a consequence that the electric current that flows to the main winding is also stabilized and that first resistive heater 13 stably generates heat and the amount of heat that is supplied is also stabilized, even after time t. Upon deformation, however, arm 22 moves away from second resistive heater 23 as shown in FIG. 3, and moves into closer heat conductive relation to first resistive heater 13, with a result that the amount of heat that it receives from first resistive heater 13 is increased. Even after the supply of heat from second resistive heater 23 is no longer available, after time t, the drop in temperature of the arm 22 is only slight. When the temperature of arm 22, heated to a temperature above 90° C. and deformed, is lowered to a selected reset temperature, e.g., a temperature below 70° C., it returns to its original shape. According to switch device 1 of the invention, however, when arm 22 is deformed, it moves in the direction of approaching first resistive heater 13, with a resultant increase in the amount of heat it receives from first resistive heater 13. Even if the amount of heater 23' that is supplied from second resistive heater 23 becomes zero, therefore, the temperature will not fall below 70° C. Accordingly, arm 22 is maintained in the actuated state after deformation and during operation after starting of motor 10, with a result that no electric current flows to the start winding. If arm 22 were arranged so that it did not move closer to first resistive heater 13, on the other hand, there would be little increase in the amount of heat that is supplied from first resistive heater 13. Therefore, the temperature would drop, as shown by a dashed line 22" in FIG. 5, and, by the time heat supplied from the second resistive heater 23 becomes zero, the temperature of arm 22 drops below 70° C., with the original shape being restored. Therefore, contact 25 again assumes the closed state and the electric current again flows to the start winding.

The action of the start device 9 has been explained above. Next, the action of the protection device 8 will be explained:

In protection device 8, bimetal element 14 of the first switch circuit 11 is arranged in close proximity to first resistive heater 13 to be heated by the generation of heat by first resistive heater 13. In connection with the starting and operation of motor 10, the temperature of bimetal element 14 increases. During normal starting and operation, however, the temperature of bimetal element 14 does not increase to the actuation temperature of 145° C. In this case, therefore, bimetal element 14 is not deformed and contact 15 remains in a closed state. In the case where an excessive current flows to motor 10 due to a motor fault or the like, a large amount of heat is generated by first resistive heater 13, with a result that bimetal element 14 is thereby heated to the actuation temperature, 145° C. As shown in FIG. 4, arm 12 is pushed up by motion transfer element 12a biased by bimetal element 14 upon actuation, with a result that contact 15 assumes an open state and first switch 11 de-energizes the motor. When the electric current that has been flowing to motor 10 is interrupted, the electric current that flows to first resistive heater 13 becomes zero, with a consequence that the heat generation of first resistive heater 13 terminates (with no electric current flowing even to second resistive heater 23). As heat generation is no longer present, the temperature of bimetal element 14 and arm 22 of the second switch circuit 21 will decrease. Regarding arm 22, it is so constructed that, at the time when the temperature has reached a level lower than 70° C., it resets to its original shape and contact 25 is made to assume a closed state. Bimetal element can be either manually resettable or can automatically reset upon cooling to a selected reset temperature. Because of this, the contacts are in the closed state after the completion of the operation of motor 10, with motor 10 being prepared to start once again.

According to the switch device of this invention which as been explained above, starting and over-current protection of motor 10 can be carried out with a simple device. Thus, its practical usefulness is high. It is mentioned in this connection that the actuation temperature and the reset temperature of bimetal element 14 and arm 22 are mere examples. They can be set at various levels.

Figure 6A:
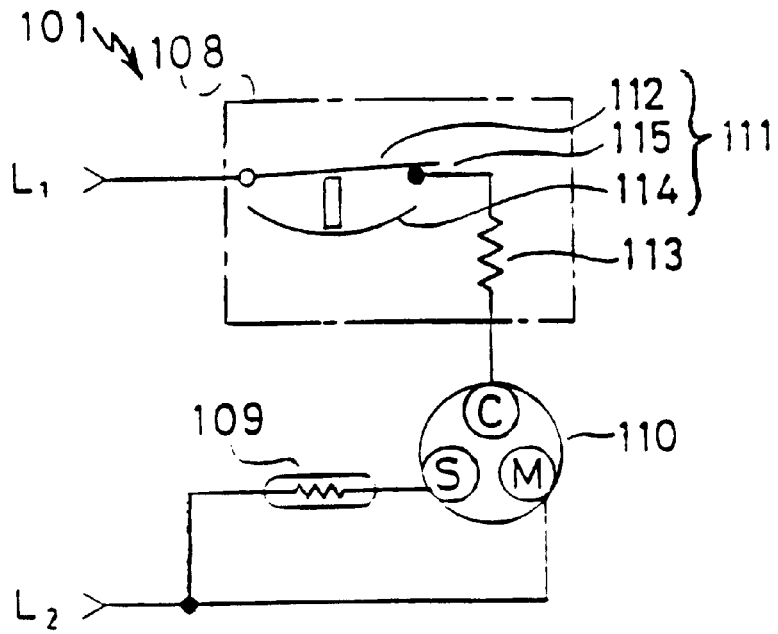
FIGS. 6(a) and 6(b) are circuit diagrams of a prior art switch in the closed and open states, respectively.
Figure 6B:
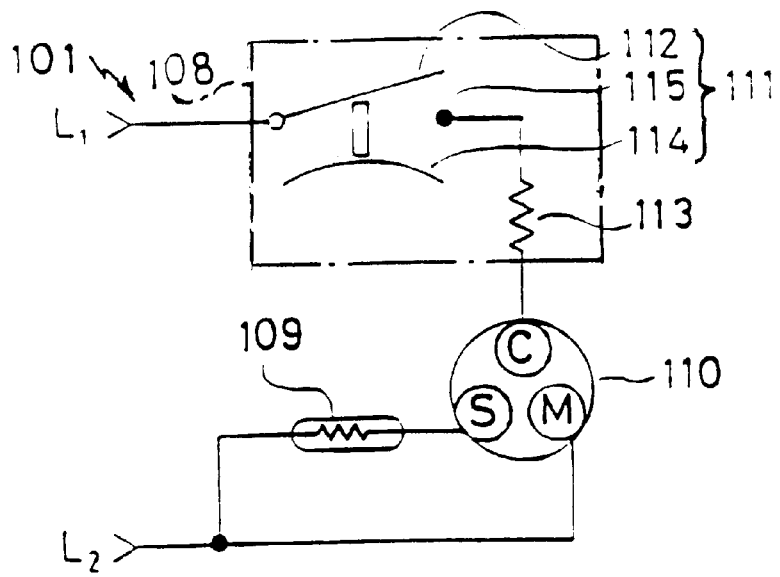

Thus, it will be seen that the first switch circuit and the second switch circuit can be arranged closely together in a single housing with a result that the number of parts required will be reduced, thereby lowing the manufacturing cost of the switch device. If desired, a resistance element 109 shown in FIG. 6 may be used as the second heater. Since the second switch circuit is in a de-energized state after the start-up of the motor, the electric current that flows to the start winding will become zero, thereby making it possible to efficiently operate motor. The resistance value of the resistance heater that heats the arm of the second switch circuit can be made small and the starting electric current can be made large, with a consequence that the starting characteristics of the motor can be improved.

It will be appreciated by those skilled in the art that the invention is not limited to the particular embodiment illustrated and discussed herein. Further, it is intended that the scope of the invention be determined only by the appended claims.

What is claimed:

1. A combination motor starting relay and motor protector apparatus comprising a casing forming a cavity having first and second switch chambers, a motor protector switch disposed in the first switch chamber having a movable contact arm movable into and out of engagement with a first stationary contact and a first snap acting thermostatic element movable between convex and concave configurations in dependence upon temperature, the first snap acting thermostatic element arranged so that upon changing configuration due to an increase in temperature to an actuation temperature the first snap acting thermostatic element biases the movable contact arm out of engagement with the first stationary contact, a first resistive heater disposed in the first switch chamber in heat conductive relation with the first thermostatic element, a motor starting switch disposed in the second switch chamber having a second electrically conductive, snap acting thermostatic element movable between convex and concave configurations in dependence upon temperature and having a free end movable into and out of electrical engagement with a second stationary contact in response to the change in configurations of the second thermostatic element, the second thermostatic element being disposed in heat conductive relation with the first resistive heater, a second resistance heater disposed in the second switch chamber in heat conductive relation with the second thermostatic element, the second thermostatic element upon moving into the configuration with the free end out of electrical engagement with the second stationary contact being closer to the first resistance heater in improved heat conductive relation therewith.

2. A combination motor starting and motor protector apparatus according to claim 1 further comprising a motion transfer pin disposed in the casing between the movable contact arm of the motor protector switch and the first snap acting thermostatic element to transfer motion from the first snap acting thermostatic element to the movable contact arm.

3. A combination motor starting and motor protector apparatus according to claim 1 in which the movable contact arm of the motor protector switch is serially connected to the first resistive heater and the second snap acting thermostatic element is serially connected to the second resistive heater.

4. A combination motor starting and motor protector apparatus according to claim 1 in which the second resistive heater is a PTC element.

* * * * *